US007331133B2

(12) United States Patent
Bauernfeind

(10) Patent No.: US 7,331,133 B2
(45) Date of Patent: Feb. 19, 2008

(54) METHOD OF IDENTIFYING AND DOCUMENTING HAIL DAMAGE

(76) Inventor: Jason Bauernfeind, 704 Shiloh Dr., Raymore, MO (US) 64083

( * ) Notice: Subject to any disclaimer, the term of this patent is extended or adjusted under 35 U.S.C. 154(b) by 413 days.

(21) Appl. No.: 11/034,894

(22) Filed: Jan. 13, 2005

(65) Prior Publication Data
US 2005/0155260 A1 Jul. 21, 2005

Related U.S. Application Data

(60) Provisional application No. 60/536,618, filed on Jan. 15, 2004.

(51) Int. Cl.
*G09F 7/04* (2006.01)
(52) U.S. Cl. ..................... 40/600; 40/661.01
(58) Field of Classification Search ............. 40/124.04, 40/661.01, 600
See application file for complete search history.

(56) References Cited

U.S. PATENT DOCUMENTS

| 2,431,827 | A | * | 12/1947 | Rado ............................ 40/621 |
| 3,111,736 | A | * | 11/1963 | Budreck ....................... 24/303 |
| 3,456,373 | A | * | 7/1969 | Epton ........................... 40/124 |
| 6,219,930 | B1 | * | 4/2001 | Reid ............................. 33/562 |
| 6,775,935 | B1 | * | 8/2004 | Cohen et al. ................. 40/600 |
| 2002/0154574 | A1 | * | 10/2002 | Ector et al. ................... 368/89 |
| 2004/0016159 | A1 | * | 1/2004 | Ausland et al. ............... 40/600 |
| 2004/0073434 | A1 | * | 4/2004 | Volquardsen et al. .......... 705/1 |

* cited by examiner

*Primary Examiner*—Gary C. Hoge
(74) *Attorney, Agent, or Firm*—Chase Law Firm, L.C.

(57) ABSTRACT

A consistent and effective method of identifying and documenting vehicle dent damage includes the steps of identifying dents on a damaged vehicle, applying an easily visible magnetic marker over each dent on the damaged vehicle, counting the markers on the damaged vehicle, photographing the markers on the damaged vehicle and removing the markers from the damaged vehicle.

17 Claims, 4 Drawing Sheets

METHOD OF IDENTIFYING AND DOCUMENTING HAIL DAMAGE

This application claims the priority of application Ser. No. 60/536,618 filed Jan. 15, 2004.

FIELD OF THE INVENTION

This invention relates to a method of identifying and documenting hail damage to a vehicle. More specifically, the method includes magnetically attaching a visible marker at each hail dent on a vehicle so that the extent of hail damage can be accurately determined and photographically documented.

BACKGROUND OF THE INVENTION

Generally, accountability is very important and a key operational concept among vehicle insurance companies and affiliated repair facilities. However, a consistent and effective technique for estimating and documenting vehicle hail damage is lacking.

The current methods of identifying and documenting vehicle dents in the insurance and repair industries are generally ineffective, especially when the vehicle has been damaged by hail. The extent and location of dent damage is often determined by using a best guess method. This technique can obviously be very inaccurate. Furthermore, hail dents do not show up well in photographs and thus their number and location are not documented.

Another technique used involves the placement of wax markers over the dents within a fraction of the area of a vehicle panel (e.g., typically over ¼ of a panel) and multiplying by the necessary factor (e.g., 4) to obtain an estimated number of dents. Hail damage is very random and inconsistent, so this method is also inaccurate. Furthermore, the wax markers also do not show up well in photographs and require timely cleanup. If the vehicle panel is dirty, the cleanup removal of the wax markers can scratch the vehicle's paint. Finally, because the wax markers are only placed on a fraction of the dents, the location of each dent is not documented.

Furthermore, most insurance companies do not ever require photographs of hail damage claims because small to medium sized dents do not show up. Some insurance companies have adjustors take one photograph of the damaged car to prove it exists, but the hail dents are not visible. The lack of good hail damage photographs is a problem for the internal auditors, inside claims adjustors and even shareholders since they have no documentation showing the millions of dollars spent each year in paid out hail damage claims.

Problems with these current methodologies are exacerbated when insureds file duplicate hail damage claims. As an example, an insured may be issued payment for vehicle damage after a first hailstorm. The insured, however, does not have repairs made to the damaged vehicle. When a second hail storm further damages the vehicle, no pictures exist showing the amount of and location of the damage incurred as a result of the initial storm. The current techniques also do not deter the owners of hail damaged vehicles from claiming the same damage with several different insurance companies.

The current techniques also unnecessarily increase costs and overhead to the insurance companies. For instance, auditors currently have to reinspect hail damaged vehicles because accurate photos cannot be filed. In contrast, for collision repairs the insurance industry has established networks of collision repair shops which take photographs of the collision damage, prepare a cost estimate for completing the necessary repairs and then repair the damage. Upon completion of the repairs, the insured pays the shop the deductible and the insurance company pays the balance of the cost directly to the shop. This direct payment method reduces the insurance company's overhead and allows the insurance company to warrant repairs and control expenses. For a repair shop to qualify, a main criteria is that the shop must be able to annotate and upload photographs to show the damaged areas of the vehicle. Because hail damage is difficult to show using the current techniques, the dent repair industry does not have a consistent direct pay network established.

Thus, hail and dent damage is not estimated in any consistent way. The dent damage estimates obtained are generally not accurate and undocumented.

SUMMARY OF THE INVENTION

Accordingly, a consistent and effective method of identifying and documenting vehicle dent damage is needed. Such a method includes the steps of identifying dents on a damaged vehicle, applying an easily visible magnetic marker over each dent on the damaged vehicle, counting the markers on the damaged vehicle, photographing the markers on the damaged vehicle and removing the markers from the damaged vehicle.

DETAILED DESCRIPTION

Figure 1:
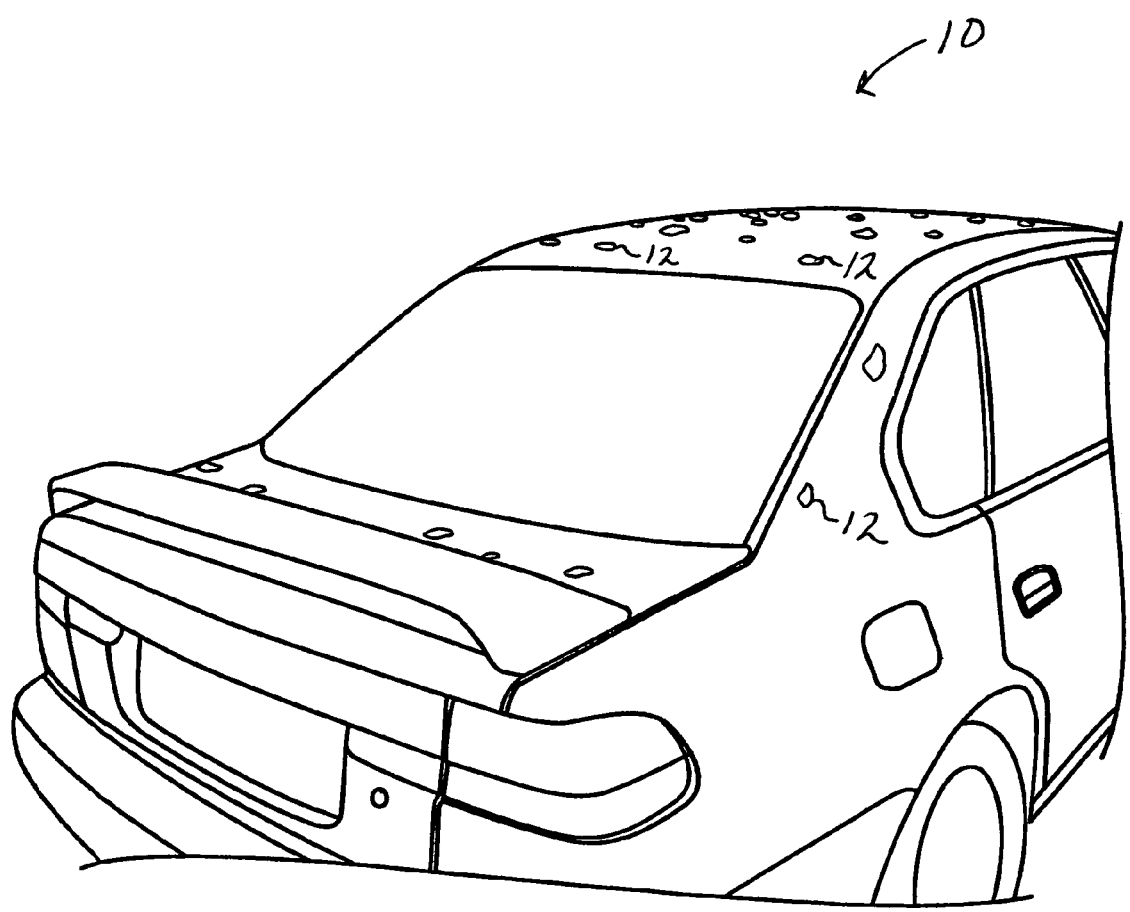
FIG. 1 is a partial perspective view of a hail damaged vehicle, with the hail dents enlarged for clarity.

A method of identifying and documenting hail damage is shown in FIGS. 1-5. FIG. 1 shows a vehicle 10 that has been damaged, in this case by hail. The hail dents 12 have been enlarged in the drawing for clarity. Vehicle dents, especially those caused by hail such as dents 12, can typically be numerous, difficult to see and very random.

Figure 2:
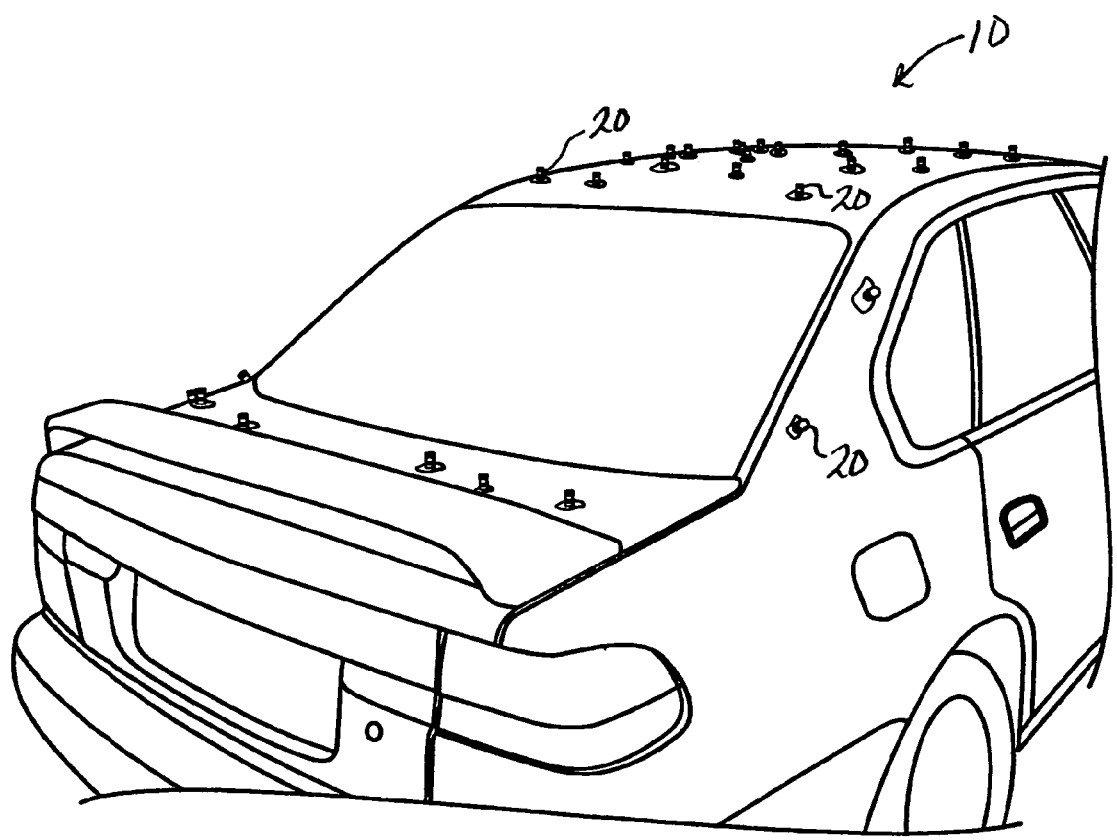
FIG. 2 shows the vehicle of FIG. 1 but with a dent marker placed on each dent in accordance with the present invention.
Figures 4, 5:
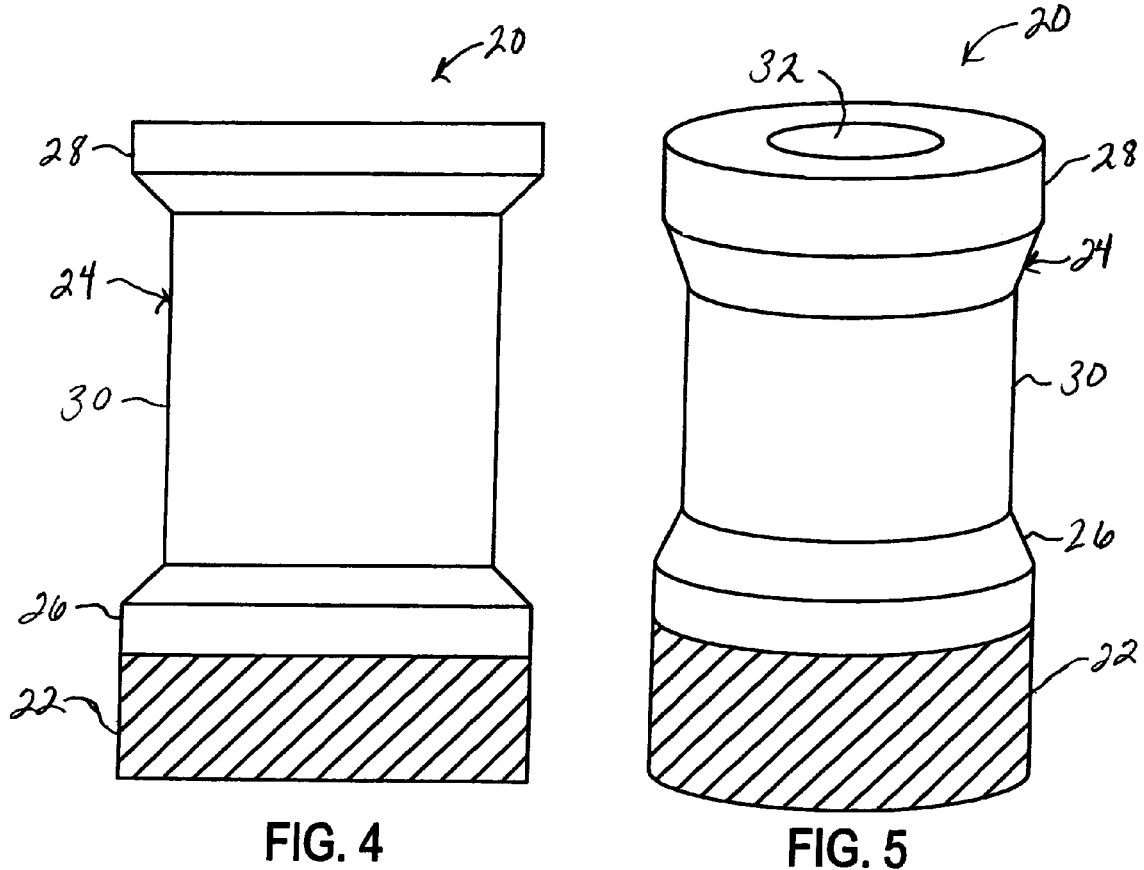
FIG. 4 is a side view of a marker used in accordance with the present invention.
FIG. 5 is a perspective view of the marker of FIG. 4.

Magnet markers 20, as shown in detail in FIGS. 4 and 5, are attached to the damaged vehicle 10 over each dent 12, as shown in FIG. 2. The magnet markers 20 can be of various sizes to correspond to the size of the dent 12 over which they are placed.

Each magnet marker 20 includes a disk-shaped magnet 22 which preferably has a circular transverse cross-section so as to present a smooth, continuous side surface. This eliminates sharp points, which could cause further damage to the vehicle as the magnets 22 are placed over the dents 12 and removed therefrom.

Each magnet marker 20 also includes a marker component 24 attached to the top surface of the magnet 22 to form an integral, unitary member. The marker components 24 are brightly colored, so they show up well in photos and video.

The marker components 24 are preferably formed of any suitable lightweight material, such as wood, plastic or foam.

The marker components 24 also serve as a placement stem and facilitate the placement and removal process. In this regard, each marker component 24 includes a base 26, a top 28 and a stem 30. The base 26 securely attaches at its bottom surface to the magnet's top surface. The base 26 and the top 28 each taper inwardly to form a junction with the stem 30. The stem 30 extends between the base 26 and the top 28 and has a diameter smaller than the largest diameter of the base 26 and the top 28. Thus, the person placing the magnets 20 typically grasps them at the stem 30, and the top 28 helps prevent the magnet 20 from slipping out of the person's grasp.

As shown in FIG. 5, the marker 24 is hollow and includes a throughbore 32. Thus, marker 24 is as lightweight as possible. Alternatively, the marker components 24 could be electronic, providing the capability for electronic or optical documentation.

Magnet markers 20 are placed over each vehicle dent 12 as shown in FIG. 2. Magnet markers 20 are easily secured over each dent 12 since the bottom surface of the magnet 22 adheres to the vehicle's metal surfaces including a side surface as shown. The damage to the vehicle 10 is now easily documented in photographs and/or video as desired. The marker components 24 are easily seen in photos and video. They extend upwardly and/or outwardly from the vehicle's surface unlike dents 12. Preferably, they are also brightly colored and contrast with the vehicle's paint color.

The extent of the dent damage to the vehicle 10 can now be easily documented. The markers 20 are easily counted for recording the number of dents 12. Also, the markers 20 are easily visible in photos and video for recording the location of the dents 12.

Upon completion of sufficient documentation, the magnet markers 20 are easily removed by simply pulling them from the vehicle's surface. Thus, the magnet markers 20 are also reusable.

Figure 3:
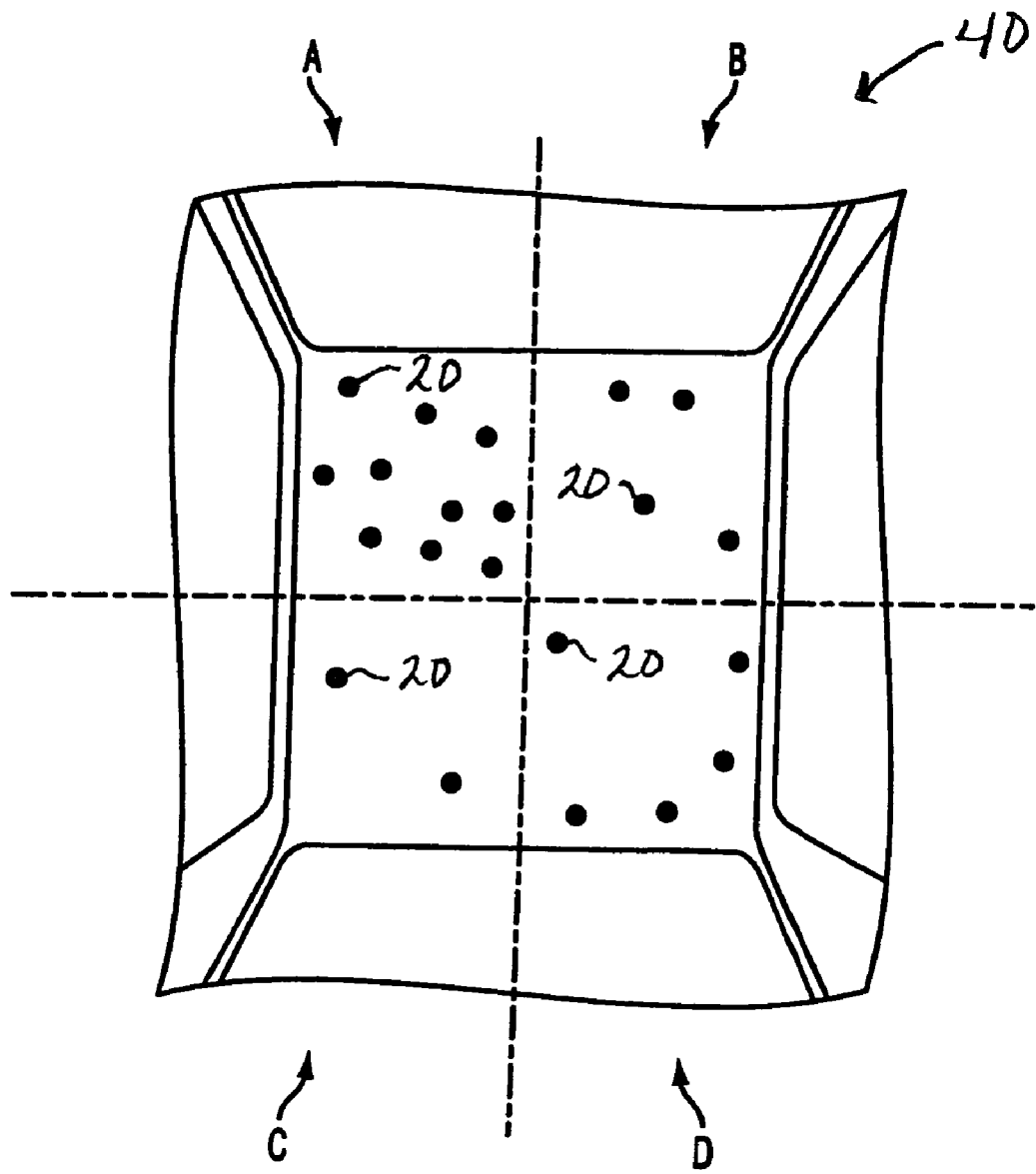
FIG. 3 is a top view of the roof of the vehicle of FIG. 2 divided into quadrants to show the randomness of hail damage.

As shown in FIGS. 1-3, vehicle dents, especially those caused by hail, such as dents 12, can typically be numerous and occur very randomly over the surface of the vehicle 10. FIG. 3 highlights this randomness. FIG. 3 shows the roof 40 of the dented vehicle 10 with the magnet markers 20 placed over each dent 12. To illustrate the random nature of hail dents, the roof 40 is divided into four quadrants, A, B, C and D. Quadrant A has ten dents 12, quadrant B has four dents 12, quadrant C has only two dents 12 and quadrant D has five dents 12. This illustrates the need for magnet markers 20 to be placed over each dent 12. Otherwise, an accurate assessment of the dent damage to the vehicle 10 would not be obtained. Any estimate could be exaggerated, if for instance an estimate was based on the number of dents in quadrant A, or could be greatly underestimated if for instance an estimate was based on the number of dents in quadrant C.

This method makes it possible to identify the number of dents made to vehicles and document the location of the dents in digital or standard photographs, and digital or VHS video. More specifically, vehicle dents, especially those caused by hail, are typically very difficult to see in person. Accordingly, the dents cannot be identified when photographed. This method provides an easy, efficient, low cost and accurate way to highlight the dents and make them easily countable and visible in photos and video.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A method of identifying and documenting hail damage, comprising the steps of:
   identifying hail dents;
   applying a marker over each dent;
   documenting the markers;
   removing the markers.

2. The method of identifying and documenting hail damage as claimed 1 in claim wherein the hail dents are on a vehicle.

3. The method of identifying and documenting hail damage as claimed in claim 1 wherein the marker is magnetic.

4. The method of identifying and documenting hail damage as claimed in claim 1 wherein the step of documenting the markers includes counting the markers.

5. The method of identifying and documenting hail damage as claimed in claim 1 wherein the step of documenting the markers includes photographing the markers.

6. The method of identifying and documenting hail damage as claimed in claim 1 wherein the step of documenting the markers includes video recording the markers.

7. A method of identifying and documenting damage to a vehicle, comprising the steps of:
   identifying dents on a damaged vehicle;
   applying a marker over each dent;
   documenting the markers;
   removing the markers.

8. The method of identifying and documenting damage to a vehicle as claimed in claim 7 wherein the damage includes hail dents.

9. The method of identifying and documenting damage to a vehicle as claimed in claim 7 wherein the marker is magnetic.

10. The method of identifying and documenting damage to a vehicle as claimed in claim 7 wherein the step of documenting the markers includes counting the markers.

11. The method of identifying and documenting damage to a vehicle as claimed in claim 7 wherein the step of documenting the markers includes photographing the markers.

12. A marker for documenting vehicle damage, comprising:
   a base member adapted for placement over the vehicle damage; and
   a damage marker component on a top surface of said base member and means for documenting the placement of said base member on the vehicle.

13. A marker as claimed in claim 12 wherein said base member is magnetic.

14. A marker as claimed in claimed in claim 12 wherein said base member is disk-shaped.

15. A marker as claimed in claim 12 where said marker component presents a placement stem.

16. A marker as claimed in claim 12 wherein said marker component is brightly colored.

17. A marker as claimed in claim 12 wherein said placement stem includes a bottom portion, a stem and a top portion;
   said bottom portion being secured to said top surface of said base member;
   said stem extending between said bottom and top portions facilitating the placement and removal of the markers.

* * * * *